United States Patent [19]

Muggli et al.

[11] Patent Number: 5,468,812
[45] Date of Patent: Nov. 21, 1995

[54] POLYMERIZABLE FLUOROCHEMICAL SURFACTANTS

[75] Inventors: Imelda A. Muggli, St. Paul; Roger R. Alm, Lake Elmo, both of Minn.

[73] Assignee: Minnesota Mining and Manufacturing Company, St. Paul, Minn.

[21] Appl. No.: 311,364

[22] Filed: Sep. 26, 1994

Related U.S. Application Data

[63] Continuation of Ser. No. 679,430, Apr. 2, 1991, abandoned.

[51] Int. Cl.⁶ .................................................. C08F 8/00
[52] U.S. Cl. ..................... 525/293; 428/422; 525/291; 525/303; 525/326.2; 526/248; 526/243; 526/245; 526/246; 560/222; 560/223; 560/224
[58] Field of Search .................... 525/291, 293, 525/295, 296, 303, 326.2, 326.4

[56] References Cited

U.S. PATENT DOCUMENTS

| | | |
|---|---|---|
| 3,787,351 | 1/1974 | Olson . |
| 4,246,387 | 1/1981 | Deutsch . |
| 4,366,299 | 12/1982 | Dessaint ........................ 525/326.2 |
| 4,415,615 | 11/1983 | Esmay et al. . |
| 4,560,599 | 12/1985 | Regen . |
| 4,569,798 | 2/1986 | Nieh . |
| 4,617,343 | 10/1986 | Walker et al. . |
| 4,666,993 | 5/1987 | Urano ........................... 525/326.2 |
| 4,756,989 | 7/1988 | Ai ................................. 525/326.2 |
| 4,929,666 | 5/1990 | Schmidt et al. . |

FOREIGN PATENT DOCUMENTS 2172889 11/1988 United Kingdom .

OTHER PUBLICATIONS

*Paint and Varnish Production*, Mar. 1972 (Pike).
*Res. Discl.*, 1981, 208, 309.
*Zh. Fiz. Khim.*, 1982, 56, 2898 (Abstract).

Primary Examiner—Christopher Henderson
Attorney, Agent, or Firm—Gary L. Griswold; Walter N. Kirn; Robert H. Brink

[57] ABSTRACT

Polymerizable, organic-soluble, oligomeric fluorochemical surfactant compositions having at least two pendent fluoroaliphatic groups, at least two organic-solubilizing groups, and a pendent polymerizable olefinic group. Also a method of preparing such surfactant compositions. The compositions reduce the surface energy of acrylate-containing mixtures and acrylate-based pressure-sensitive adhesives. They can be used in preparing acrylate-based pressure-sensitive adhesives that coat well due to the presence of the surfactant and maintain adhesive performance upon aging.

22 Claims, No Drawings

POLYMERIZABLE FLUOROCHEMICAL SURFACTANTS

This is a continuation of application Ser. No. 07/679,430, filed Apr. 2, 1991, now abandoned.

BACKGROUND OF THE INVENTION

1. Field of the Invention

This invention relates to fluorochemical surfactants. In another aspect this invention relates to polymerizable surfactants.

2. Description of the Related Art

Fluorochemical surfactants are commonly used to lower the surface tension of organic liquids. For example, *Paint and Varnish Production* March 1972 (Pike) describes the use of fluorochemical surfactants such as FC-430 and FC-431 (3M) in order to improve wetting in solution and solvent-free coating. Problems that can be addressed using fluorochemical surfactants include retracting of the coating into beads, cratering, "orange peel", pigment floating and flooding, and poor leveling.

U.S. Pat. No. 3,787,351 (Olson) describes oligomers containing fluoroaliphatic radicals and poly(oxyalkylene) solubilizing moieties. The oligomers are said to be useful as wetting agents in order to improve the mechanical properties of shaped articles of filled resin composites, e.g., glass-reinforced polyester or epoxy resin composites. Further, U.S. Pat. No. 4,415,615 (Esmay et al.) discloses the use of some of the oligomers of U.S. Pat. No. 3,787,351 as surfactants in the preparation of cellular pressure-sensitive adhesives in order to produce a uniform cell structure.

Non-fluorinated polymerizable surfactants have been described, e.g., in U.S. Pat. No. 4,560,599 (Regen). That patent describes a method for direct stepwise coating of a solid substrate with a polyfunctional polymerizable surfactant. Among the polymerizable surfactants used are methacrylate-functional phosphatidyl cholines and phosphate esters. U.S. Pat. No. 4,569,798 (Nieh) describes amphoteric tertiary amine-substituted acrylamides that are said to be useful as surfactants in aqueous solutions and in the preparation of water-soluble copolymers that have surface active properties.

U.S. Pat. No. 4,246,387 (Deutsch) describes ring-sulfonated maleate half-esters of alkoxylated alkyl arylols, and U.S. Pat. No. 4,617,343 (Walker et al.) describes the use of such surfactants in the preparation of an emulsion polymer for a laminating adhesive.

*Res. Discl.*, 1981, 208, 309 describes the preparation of vinyl surfactants by reacting a surfactant containing a single active hydrogen (such as a polyethylene glycol ether of a secondary alcohol) with an addition-polymerizable isocyanate such as 2-isocyanato ethyl methacrylate.

*Zh. Fiz. Khim.*, 1982, 56, 2898 (Abstract) describes fluorine-containing acrylates of the formula $CH_2=CHCO_2CH_2(CF_2CF_2)_nR$, wherein R is H or F, and n is 1 to 4, as being useful for imparting hydrophobicity and chemical resistance to the surface of polymers by copolymerization.

U.K. Patent GB 2,172,889 B (Wakatsuki et al.) describes phosphoric esters of the formula

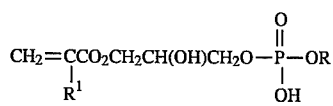

wherein $R^1$ is hydrogen or methyl, R is inter alia a linear or branched fluoroalkyl group which has from 1 to 36 carbon atoms and at least 1 fluorine atom. These compounds are said to have good surface activity, self-organizability, and polymerizability.

SUMMARY OF THE INVENTION

This invention provides a polymerizable, organic-soluble, oligomeric fluorochemical surfactant composition comprising one or more fluorinated oligomers, each comprising at least two pendent fluoroaliphatic groups, at least two organic-solubilizing groups, and a pendent polymerizable olefinic group.

In a preferred embodiment, this invention provides a polymerizable, organic-soluble, oligomeric fluorochemical surfactant composition comprising one or more fluorinated oligomers, each comprising an oligomeric aliphatic backbone having bonded thereto:

(i) at least two fluoroaliphatic groups, each having a fully fluorinated terminal group;

(ii) at least two organic-solubilizing groups, each comprising a plurality of carbon atoms and optionally comprising one or more catenary oxygen atoms; and (iii) at least one polymerizable olefinic group, each fluoroaliphatic group, organic-solubilizing group, and polymerizable olefinic group being independently bonded to the aliphatic backbone through a covalent bond, a heteroatom, or an organic linking group.

In a further preferred embodiment, this invention provides polymerizable fluorochemical surfactant compositions comprising one or more oligomers comprising a portion represented by Formula I

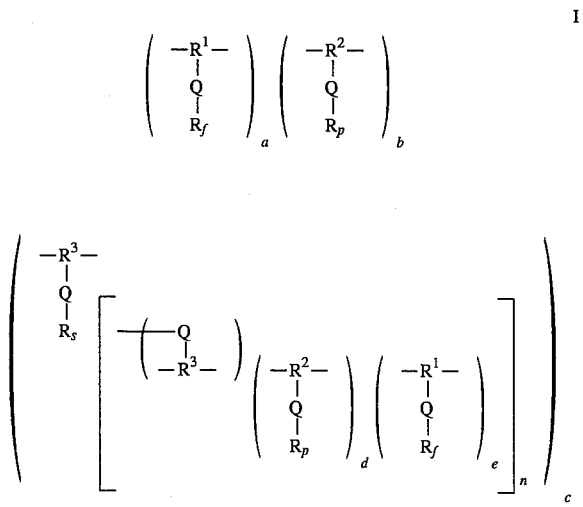

wherein:

$R^1$, $R^2$, and $R^3$ respectively represent polymerized units derived from fluorinated, solubilizing and bifunctional monomers and together form an aliphatic backbone;

each Q independently is a covalent bond, a heteroatom, or an organic linking group;

$R_f$ is a fluoroaliphatic group containing a fully fluorinated terminal group;

$R_s$ is an organic-solubilizing group comprising a plurality of carbon atoms and optionally comprising one or more catenary oxygen atoms;

$R_p$ is a polymerizable olefinic group; and a, b, c, d, and e are whole numbers such that the compound is oligomeric, and each n is independently zero or one. In embodiments wherein n is zero, the solubilizing groups $R_s$ are pendent and the oligomers are not crosslinked. In embodiments wherein n is one, the solubilizing groups $R_s$ are catenary and the oligomers are crosslinked.

This invention also provides a process for preparing a composition as described above, comprising the steps of:

(i) oligomerizing fluorinated, solubilizing and bifunctional monomers to form an intermediate composition comprising one or more fluorinated oligomers each comprising at least two pendent fluoroaliphatic groups, at least two organic-solubilizing groups, and a pendent group that can be converted or further elaborated into a polymerizable olefinic group; and (ii) converting or further elaborating the intermediate from step (i) in order to provide the composition comprising a polymerizable olefinic group.

The polymerizable fluorochemical surfactants of this invention reduce the surface energy of acrylate-containing mixtures and acrylate-based pressure-sensitive adhesives. They can be used in the preparation of acrylate-based pressure-sensitive adhesives that coat well due to the presence of the surfactant and maintain adhesive performance upon aging.

DETAILED DESCRIPTION OF THE INVENTION

Formulas used herein to represent the structures of the oligomers of the invention indicate the presence of chains of randomly polymerized units derived from several types of monomers; those formulas are not intended to indicate ordering of units, e.g., "blocks" of units such as in a block copolymer, or alternating units in the chain. The terms "oligomer" or "oligomeric" when used herein designate compounds containing a plurality of polymerized units, but fewer than that number of polymerized units present in a polymer, e.g., chains of 5 to about 100 polymerized units.

The fluoroaliphatic group is designated herein as $R_f$. $R_f$ is a stable, inert, nonpolar, preferably saturated monovalent moiety which is both oleophobic and hydrophobic. A fluorinated oligomer preferably comprises from 2 to about 25 $R_f$ groups and preferably comprises about 5 percent to about 30 percent, and more preferably about 8 percent to about 20 percent fluorine by weight based on the total weight of the oligomer, the loci of the fluorine being essentially in the $R_f$ groups. $R_f$ preferably contains at least about 3 carbon atoms, more preferably 3 to about 20 carbon atoms, and most preferably about 6 to about 12 carbon atoms. $R_f$ can contain straight chain, branched chain, or cyclic fluorinated alkyl groups or combinations thereof or combinations thereof with straight chain, branched chain, or cyclic alkyl groups. $R_f$ is preferably free of polymerizable olefinic unsaturation and can optionally contain catenary heteroatoms such as oxygen, divalent or hexavalent sulfur, or nitrogen. It is preferred that each $R_f$ contain about 40% to about 78% fluorine by weight, more preferably about 50% to about 78% fluorine by weight.

The terminal portion of the $R_f$ group contains a fully fluorinated terminal group. This terminal group preferably contains at least 7 fluorine atoms, e.g., $CF_3CF_2CF_2$—, $(CF_3)_2CF$—, —$CF_2SF_5$, or the like. Perfluorinated aliphatic groups, i.e., those of the formula $C_nF_{2n+1}$, are the most preferred embodiments of $R_f$.

The organic-solubilizing group is designated herein as $R_s$. A fluorinated compound preferably comprises sufficient $R_s$ groups to render the compound soluble in organic media such as conventional solvents, e.g., ketones, esters, ethers, and hydrocarbons, polymerizable mixtures of acrylic acids, methacrylic acids, acrylates and methacrylates, and the like. The particular preferred number of $R_s$ groups will depend on the nature of the particular $R_s$ groups and the particular medium in which the compound is intended to be solubilized. Generally, however, a plurality of $R_s$ groups is preferred, e.g., 2 to about 60, more preferably 4 to about 30. Each $R_s$ contains at least 4 carbon atoms and optionally contains at least one catenary oxygen atom. $R_s$ preferably contains from 8 to about 50 carbon atoms and can be straight chain, branched chain, cyclic, or any combination thereof. The organic-solubilizing group $R_s$ is preferably pendent to the fluorinated oligomer. In such instances, n in Formula I is zero. It can also be a catenary group, in which case n in Formula I is one. Both pendent and catenary solubilizing groups can be present, in which case at least one n is zero and at least one n is one. Preferred $R_s$ groups include polyoxyalkylene or polyoxyalkylenyl groups, e.g., polyoxyethylene or polyoxyethylenyl, and straight chain, branched chain, or cyclic alkyl or alkylene groups, e.g., butyl, butylene, octyl, octylene, isooctyl, isooctylene, octadecyl, or octadecylene, and combinations thereof.

The polymerizable olefinic group is designated herein as $R_p$. $R_p$ can be any olefinic group that is capable of undergoing a free-radical polymerization reaction. Examples of such groups include ethenyl as found in, e.g., an acrylate or a vinyl ether, and 2-propenyl as found in, e.g., a methacrylate. A fluorinated compound can contain a plurality of polymerizable olefinic groups and preferably contains one polymerizable olefinic group.

The polymerizable fluorochemical surfactant compositions of the invention will be further illustrated with reference to the preferred embodiment shown in Formula I.

In the preferred embodiment illustrated in Formula I, the aliphatic backbone comprises a sufficient number of polymerized units to render the compound oligomeric. It is preferred that the backbone comprise about 5 to about 100 polymerized units, more preferably 10 to about 50, and most preferably 20 to about 40. A single polymerized unit can contain more than one type of pendent group. However, the polymerized units are preferably derived from fluorinated monomers, i.e., those containing a fluoroaliphatic group, bifunctional monomers, i.e., those containing a functional group that can be converted or further elaborated into a polymerizable olefinic group, and solubilizing monomers, i.e., those containing solubilizing groups. The relative and absolute numbers of the several types of polymerized units in a compound are preferably such that the preferred number of the several types of corresponding pendent groups are present in the oligomer. Accordingly, with reference to Formula I, it is preferred that the sum of a and all occurrences of e is about 2 to about 25, more preferably 5 to about 15; the sum of b and all occurrences of d is at least 1 to about 60, more preferably 2 to about 30; c is about 2 to about 60, more preferably 4 to about 30.

The ratio of moles of the several types of polymerized units, and therefore the number of fluorinated, solubilizing, and polymerizable olefinic groups, in the aliphatic backbone will not be the same in each oligomer present in a composition of the invention. Therefore compositions and oligomers of the invention are generally characterized herein with respect to the overall ratio of polymerized units derived from each of the several types of monomers, which is determined primarily by the relative amounts thereof used in the preparation of the composition.

The fluorinated, solubilizing, and polymerizable groups are linked to the aliphatic backbone by a linking group designated Q in Formula I. Linking group Q can be a covalent bond, a heteroatom, e.g., O or S, or an organic moiety. The linking group Q is preferably an organic moiety containing 1 to about 20 carbon atoms, and optionally containing oxygen, nitrogen-, or sulfur-containing groups or a combination thereof, and preferably free Of functional groups, e.g., polymerizable olefinic double bonds, thiols, easily abstracted hydrogen atoms such as cumyl hydrogens, and other such functionality known to those skilled in the art, that substantially interfere with free-radical oligomerization. Examples of structures suitable for linking group Q include straight chain, branched chain, or cyclic alkylene, arylene, aralkylene, oxy, oxo, thio, sulfonyl, sulfinyl, imino, sulfonamido, carboxamido, carbonyloxy, urethanylene, ureylene, and combinations thereof such as sulfonamidoalkylene. Preferred linking groups Q can be selected according to ease of preparation and commercial availability and will differ depending on whether it links $R_f$, $R_s$, or $R_p$ to the aliphatic backbone.

Below is a partial representative list of suitable organic Q groups. For the purposes of this list, each k is independently an integer from 1 to about 20, g is an integer from 0 to about 10, h is an integer from 1 to about 20, R' is hydrogen, phenyl, or alkyl of 1 to about 4 carbon atoms, and R" is alkyl of 1 to about 20 carbon atoms.

—$SO_2NR'(CH_2)_kO(O)C$—
—$CONR'(CH_2)_kO(O)C$—
—$(CH_2)_kO(O)C$—
—$CH_2CH(OH)CH_2O(O)C$—
—$CH_2CH(OR")CH_2O(O)C$—
—$(CH_2)_kC(O)O$—
—$(CH_2)_kSC(O)$—
—$(CH_2)_kC(O)O$—
—$(CH_2)_kS(CH_2)_kO(O)C$—
—$(CH_2)_k(OCH_2CH_2)_kO(O)C$—
—$(CH_2)_kSO_2(CH_2)_kO(O)C$—
—$SO_2NR(CH_2)_kO(CH_2CH_2)_kO(O)C$—
—$(CH_2)_kSO_2$—
—$SO_2NR'(CH_2)_k$—
—$OC_6H_4CH_2O(O)C$—

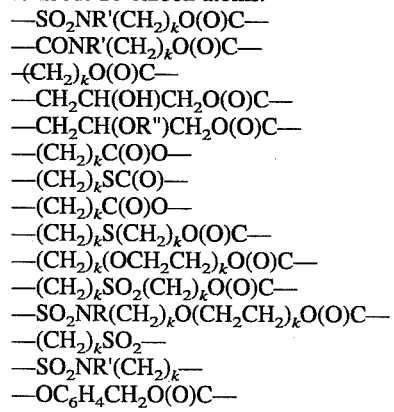

—$(CH_2)_hO((O)C(CH_2)_6O)_gC(O)(CH_2)_6OC(O)$—
—$(CH_2)_hO((O)C(CH_2)_6NH)_gC(O)(CH_2)_6NHC(O)$—
—$C(O)O(CH_2)_2OC(O)NH(CH_2)_2OC(O)$—

For linking $R_f$, Q is preferably alkylene or sulfonamido, or sulfonamidoalkylene. For linking $R_s$, Q is preferably carbonyloxy. For linking a $R_p$ group, Q is preferably —$C(O)O(CH_2)_2OC(O)NH(CH_2)_2OC(O)$—.

The aliphatic backbone of course does not exist in the form shown in Formula I. Rather it is terminated on each end by hydrogen or by some organic group (not shown in Formula I). The terminal groups are present by virtue of the method used to prepare the compositions. The particular terminal groups present in a particular fluorinated compound are not unduly critical to the function of the compositions of the invention. Typical terminal groups include hydrogen or an alkylthio group, which would be derived from an alkylthiol chain transfer agent.

Compositions of the invention having pendent $R_s$ groups (e.g., non-crosslinked compositions wherein n of Formula I is zero) can be prepared as shown in the Reaction Scheme below, wherein $R^1$, $R^2$, $R^3$, Q, $R_f$, $R_s$, $R_p$, a, b, and c are as defined above. G is a linking group that corresponds to, will be converted to, or will be further elaborated to linking group Q. Each R is hydrogen, halogen, or methyl, and $R_b$ is a group that can be converted or further elaborated into a polymerizable olefinic group. The groups that terminate the oligomeric chains are not shown in the Reaction Scheme.

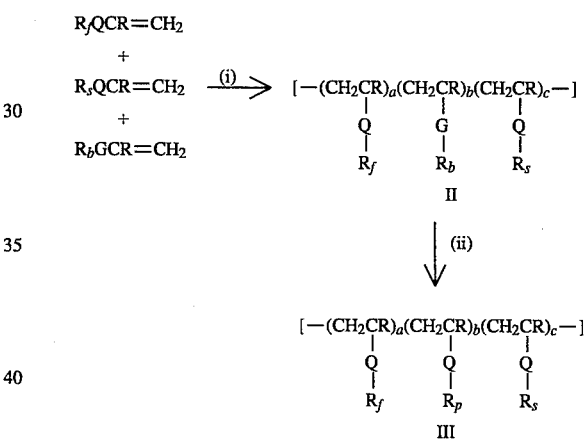

In step (i) of the Reaction Scheme, fluorinated, solubilizing, and bifunctional monomers are oligomerized to form an intermediate of Formula II. $R_b$ in a compound of Formula II and in a bifunctional monomer is a group that can be converted to or further elaborated into a polymerizable olefinic group. $R_b$ can be, for example, a group that is susceptible to a reaction such as nucleophilic or electrophilic attack by a reagent that contains a polymerizable double bond. Exemplary groups of this nature include: epoxy, azlactone (i.e., 2-oxazoline-5-one), acyl halide, alkyl halide, carboxylic anhydride, isocyanato, and other electrophilic groups; and hydroxy, amino, and other nucleophilic groups. Bifunctional monomers containing such groups are well known and generally commercially available or easily prepared by those skilled in the art. Exemplary bifunctional monomers include 2-alkenyl-2-oxazolin-5-ones such as 2-ethenyl-2-oxazoline-5-one, and 2-propenyl- 2-oxazolin-5-one; acrylamide; methacrylamide; maleamide; maleimide; N-isopropyl acrylamide; glyoxal bisacrylamide; N-methylol acrylamide; N-methylol methacrylamide; diacetone acrylamide and methacrylamide; methylolated diacetone acrylamide and methacrylamide; 2-hydroxy-3-chloropropyl acrylate and methacrylate; hydroxy $C_2$ to $C_4$ alkyl acrylates and methacrylates; aziridinyl acrylate and methacrylate; maleic

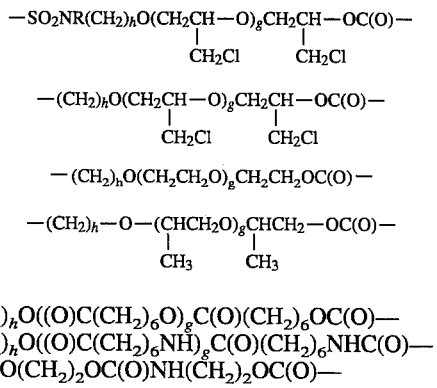

anhydride; allyl alcohol; allyl glycolate; isobutenediol; allyloxyethanol; o-allyl phenol; divinyl carbinol; glycerol α-allylether; acrylic acid, methacrylic acid, and metal salts thereof; vinylsulfonic and styrene p-sulfonic acids and their metal salts; 3-aminocrotonitrile; monoallylamide; 2-acrylamido-2-methylpropanesulfonic acid (AMPS) and its salts; glycidylacrylate and methacrylate; allyl glycidyl ether; acrolein; N,N-dimethylaminoethyl acrylate and methacrylate; N-tert-butylaminoethyl methacrylate; isocyanates containing olefinic unsaturation such as isocyanatoethyl methacrylate, bis(2-isocyanato ethyl)fumarate, methacroyl isocyanate, 1(1'-isocyanato-1'-methylethyl)- 3-(1'-methylethenyl)-benzene (available as M-TMI from American Cyanamide), and allylisocyanate; halogenated lower olefinic hydrocarbons such as 3-chloro-2-isobutene, allyl bromide, allylchloride, and methallyl chloride; vinyl esters such as vinyl acetate, vinyl propionate, vinyl isobutyrate, vinyl succinate, vinyl stearate, divinylcarbonate; allyl esters such as allyl acetate and allyl heptanoate; vinyl alkyl ketones such as vinyl methyl ketone; unsaturated acids such as acrylic, α-chloro acrylic, α-fluoro acrylic, crotonic, maleic, fumaric, itaconic, and citraconic acids, and anhydrides and esters thereof such as dimethyl maleate, ethyl crotonate, acid methyl maleate, acid butyl itaconate, and $C_1$ to $C_4$ alkyl acrylates and methacrylates.

Solubilizing monomers are well known and generally commercially available or easily prepared by those skilled in the art. Exemplary solubilizing monomers include $C_2$ and longer, and preferably $C_4$ and longer alkyl acrylate and methacrylates such as isobutyl methacrylate, isooctyl acrylate, octadecyl methacrylate and the like; acrylates and methacrylates of polyalkylene glycols, such as triethyleneglycol acrylate; acrylates and methacrylates of methoxypolyethylene glycols and polyethylene glycols (available as CARBOWAX™), block copolymers of ethylene oxide and propylene oxide endcapped by hydroxy groups (available as PLURONIC™), and tetramethyleneoxide glycols (available as TERATHANE™); and acrylamides and methacrylamides of amino-terminated polyethers (available as JEFFAMINE™).

Fluorinated monomers and methods for the preparation thereof are known and disclosed, e.g., in U.S. Pat. Nos. 2,803,615 (Ahlbrecht et al.) and 2,841,573 (Ahlbrecht et al.) which disclosures are incorporated herein by reference. Examples of such compounds include general classes of fluorochemical olefins such as acrylates, methacrylates, vinyl ethers, and allyl compounds containing fluorinated sulfonamido groups, acrylates or methacrylates derived from fluorochemical telomer alcohols, fluorochemical thiols, and the like. Particular fluorinated monomers include N-methyl perfluorooctane sulfonamidoethyl acrylate, N-methyl perfluorooctane sulfonamidoethyl methacrylate, N-ethyl perfluorooctane sulfonamidoethyl acrylate, N-methylperfluorohexylsulfonamidoethyl acrylate, the reaction product of isocyanatoethyl methacrylate and N-methylperfluorooctanesulfonamidoethyl alcohol, perfluorooctyl acrylate, N-methyl perfluorooctanesulfonamidoethyl vinyl ether, and $C_8F_{17}SO_2NHCH_2CH=CH_2$, and others such as perfluorocyclohexyl acrylate, and tetrameric hexafluoropropyleneoxide dihydroacrylate.

In step (i) of the Reaction Scheme the several types of monomers are present in the amounts necessary to afford a product containing the desired relative numbers of each type of monomer. Also present in step (i) is a chain-transfer agent that can serve to terminate the oligomeric chain at the proper length, thus controlling the absolute numbers of each type of monomer in the compound. Suitable chain-transfer agents contain a group capable of propagating and terminating a free-radical reaction and are well known to those skilled in the art. Representative chain transfer agents include thiols such as ethanethiol, propanethiol, butanethiol, n-octylthiol, t-dodecylthiol, 2-mercaptoethyl ether, 2-mercaptoimidazole, and the like. The chain-transfer agent is present in step (i) in an amount sufficient to control the number of polymerized units in the aliphatic backbone. The chain-transfer agent is generally used in an amount of about 1 to about 20 mole percent, preferably about 3 to about 10 mole percent, based on the number of moles of monomers in the reaction.

Also present in step (i) is a free-radical initiator. Such compounds are known to those skilled in the art and include persulfates, azo compounds such as azoisobutyronitrile and azo-2-cyanovaleric acid and the like, hydroperoxides such as cumene, t-butyl, and t-amyl hydroperoxide, dialkyl peroxides such as di-t-butyl and peroxide, peroxyesters such as t-butyl perbenzoate and di-t-butylperoxy phthalate, diacylperoxides such as benzoyl peroxide and lauroyl peroxide.

A suitable amount of initiator depends on the particular initiator and other reactants being used. About 0.1 percent to about 5 percent, preferably about 0.1 percent, to about 1 percent, by weight of an initiator can be used, based on the total weight of all other reactants in the reaction.

Step (i) is preferably carried out in an inert atmosphere such as for example in an atmosphere of dry nitrogen. Step (i) can be carried out in any solvent suitable for organic free-radical reactions. The reactants can be present in the solvent and can be any suitable concentration, e.g., from about 5 percent to about 90 percent by weight based on the total weight of the reaction mixture. Examples of suitable solvents include: aliphatic and alicyclic hydrocarbons, e.g., hexane, heptane, and cyclohexane; aromatic solvents, e.g., benzene, toluene, and xylene; ethers, e.g., diethylether, glyme, diglyme, and diisopropyl ether; esters, e.g., ethyl acetate and butyl acetate; ketones, e.g., acetone, methylethyl ketone, and methyl isobutyl ketone; sulfoxides, e.g., dimethyl sulfoxide; amides, e.g., N,N-dimethylformamide and N,N-dimethylacetamide; halogenated solvents such as methylchloroform, FREON™113, trichloroethylene and α, α, α-trifluorotoluene, and the like, and mixtures thereof.

Likewise, step (i) can be carried out at any temperature suitable for conducting an organic free-radical reaction. Particular temperature and solvents for use can be easily selected by those skilled in the art based on considerations such as the solubility of reagents, the temperature required for the use of a particular initiator, and the like. While it is not practical to enumerate a particular temperature suitable for all initiators and all solvents, generally suitable temperatures are between about 30° C. and about 200° C.

The product of step (i), an oligomer of Formula II, can be elaborated or converted in one or more steps via conventional methods to afford further or different functional groups. The product, however, will still be within the ambit of Formula II. For example, a hydroxy-functional compound can be reacted with an epichlorohydrin to provide a further oligomer with both hydroxy and chloro groups. As a further example, an acid-functional oligomer can be reduced by methods known to those skilled in the art to provide a hydroxy-functional oligomer, which can then be reacted with caprolactam to provide an amine-functional oligomer also containing an ester linkage.

In step (ii) an oligomer of Formula II is converted or further elaborated to comprise a polymerizable olefinic group $R_p$. Numerous reactions can be carried out in step (ii). Step (ii) generally involves the reaction of an $R_b$ group with a reagent comprising a polymerizable olefinic group and a functional group that is reactive to $R_b$. Conventional reactions, such as nucleophilic addition, electrophilic addition, and free-radical addition reactions can be used. Generally, conventional conditions are suitable for effecting the various reactions that can be used in step (ii). Particular conditions are well known to those skilled in the art and will depend on the nature of the group $R_b$ and the nature of the reagent selected to react with $R_b$.

A method of preparing a composition of the invention having catenary solubilizing groups, e.g., crosslinked compositions wherein n in Formula I is one, involves using in step (i) a bifunctional solubilizing monomer, i.e., one that contains a solubilizing group that connects two polymerizable olefinic moieties, instead of the illustrated monofunctional solubilizing monomer. Examples of suitable bifunctional solubilizing monomers include diacrylates and dimethacrylates of such polyoxyalkylene diols as CARBOWAX™1000, 1450, and 3350. When such a bifunctional solubilizing monomer is used, step (i) produces a lightly crosslinked fluorinated oligomer comprising catenary solubilizing groups. Depending on the nature of the $R_b$ group, the product of this alternate step (i) can be converted or further elaborated as described above in connection with step (ii) to afford a composition of the invention.

The compositions of the invention find use in the preparation of acrylate-based pressure-sensitive adhesive coatings. Compositions of the invention were tested according to the test methods described below.

90° Peel Adhesion

The adhesive layer to be tested is transferred to a chemically primed, 50 μm aluminum foil backing which is then slit to a width of 1.27 cm (½ inch). The resulting tape is placed such that one end protrudes over the edge of a smooth substrate plate (e.g., stainless steel, ABS rubber, or the like) and the tape is adhered to the substrate plate under the weight of a 2.04 kg hard-rubber-covered steel roller, 2 passes in each direction. After exposure to the conditions indicated below, peel adhesion is measured by moving the free end of the tape away from the substrate plate at 90 degrees and at a rate of about 0.5 cm per second using a tensile tester. Conditions are indicated in the Examples below as follows:

IN=initial 15 minute residence time of adhesive on substrate plate before peel test 3RT=three days residence time at room temperature before peel test 3HA=three days residence time at 70° C. (conditions representing accelerated aging)

Surface Tension

Surface energies were measured using the Du Nouy ring method on a Fischer Surface Tensiomat Model 21.

In the following Examples, all reactions were run under an atmosphere of dry nitrogen, and all parts and percentages are by weight, unless otherwise indicated. The particular materials and amounts thereof recited in the Examples, as well as other conditions and details, should not be construed to unduly limit the invention.

EXAMPLES

Example 1

Part A

In an approximately 950 mL bottle was placed 75.0 g (0.120 mol) of N-ethyl perfluoro(octane)sulfonamidoethyl methacrylate, 117.5 g (0.146 mol) of CARBOWAX™750 acrylate, 25.0 g (0.216 mol) of hydroxyethyl acrylate, 250 g of ethyl acetate solvent, 5.0 g (0.034 mol) of n-octyl thiol and 0.625 g of azoisobutyronitrile. The bottle and contents were deaerated under reduced pressure, purged with nitrogen, capped tightly, then heated and agitated in a Launder-O-Meter at 65° C. for 16 hours to afford a hydroxy-functional intermediate of Formula II. The bottle was cooled, degassed under reduced pressure, and purged with air.

Part B

To the solution from Part A was added 32.5 g (0.21 mol) of isocyanatoethyl methacrylate, 0.25 g hydroquinone monomethyl ether as a polymerization inhibitor, and 0.25 g of stannous octoate as a catalyst (Catalyst T-9, available from M & T Chemicals, Inc.). The capped bottle was heated at 70° C. for 5 hours in a Launder-O-Meter. Infrared analysis of the clear, dark amber polymer solution showed no unreacted isocyanato groups and indicated the presence of urethane, methacrylate, fluoroaliphatic, and polyoxyethylene groups.

Examples 2–17

Following the general procedure of Example 1, additional compositions of the invention were prepared. The particular monomers, other reactants, and catalysts are set forth in Table 1 below wherein EtFOSEMA represents $C_8F_{17}SO_2N(C_2H_5)C_2H_4OC(O)C(CH_3)=CH_2$;

EtFOSEA represents $C_8F_{17}SO_2N(C_2H_5)C_2H_4OC(O)CH=CH_2$;

MeFOSEA represents $C_8F_{17}SO_2N(CH_3)C_2H_4OC(O)CH=CH_2$;

ZONYL BA MA represents $C_nF_{2n+1}C_2H_4OC(O)C(CH_3)=CH_2$, n=6–12;

CARBOWAX 750A represents $CH_3O(C_2H_4O)_mC(O)CH=CH_2$, m=about 18;

ODMA represents $C_{18}H_{37}OC(O)C(CH_3)=CH_2$;

HOEA represents $HOC_2H_4OC(O)CH=CH_2$;

HOPMA represents $HO(CH_2)_3OC(O)C(CH_3)=CH_2$;

TBAEMA represents $(CH_3)_3CNHC_2H_4OC(O)C(CH_3)=CH_2$;

IEM represents $OCNC_2H_4OC(O)C(CH_3)=CH_2$;

T9 represents stannous octoate (M&T Chemicals, Inc.); and

T12 represents dibutyl tin dilaurate (M&T Chemicals, Inc.)

TABLE 1

| | Part A | | | | Part B | |
| --- | --- | --- | --- | --- | --- | --- |
| Example | Fluorinated Monomer (g, mol) | Solubilizing Monomer (g, mol) | Bifunctional Monomer (g, mol) | n-octylthiol (g, mol) | IEM (g, mol) | Catalyst (g) |
| 1[1] | EtFOSEMA 75 g, | 750A 118 g, | HOEA 25 g, | 5 g, | 32.5 g, | T9 0.25 g, |

TABLE 1-continued

| | Part A | | | | Part B | |
|---|---|---|---|---|---|---|
| Example | Fluorinated Monomer (g, mol) | Solubilizing Monomer (g, mol) | Bifunctional Monomer (g, mol) | n-octylthiol (g, mol) | IEM (g, mol) | Catalyst (g) |
| | 0.120 mol | 0.146 mol | 0.216 mol | 0.034 mol | 0.21 mol | |
| 2[2] | EtFOSEMA 7.5 g, 0.0120 mol | 750A 11.8 g, 0.0146 mol | HOPMA 2.5 g, 0.0173 mol | 0.50 g, 0.0034 mol | 2.6 g, 0.0167 mol | T12 0.025 g, |
| 3[2] | EtFOSEMA 7.5 g, 0.0123 mol | 750A 11.8 g, 0.0146 mol | HOEA, 2.5 g, 0.0216 mol | 0.50 g, 0.0034 mol | 3.25 g, 0.021 mol | T12 0.025 g, |
| 4[3] | Zonyl BA MA 6.0 g, 0.0114 mol | 750A 9.3 g, 0.0116 mol | HOEA 2.0 g, 0.0172 mol | 0.30 g, 0.0021 mol | 2.7 g, 0.0174 mol | T12 0.025 g, |
| 5*[4] | EtFOSEMA 10 g, 0.0160 mol | ODMA 6.7 g, 0.0198 mol | HOEA 1.33 g, 0.0115 mol | 0.15 g, 0.0010 mol | 1.7 g, 0.011 mol | T9 0.025 g, |
| 6[2] | EtFOSEMA 7.5 g, 0.0120 mol | 750A 11.8 g, 0.0146 mol | HOEA 2.5 g, 0.0216 mol | 0.06 g, 0.0004 mol | 3.25 g, 0.021 mol | T9 0.025 |
| 7[2] | EtFOSEMA 7.5 g, 0.0120 mol | 750A 11.8 g, 0.0146 mol | HOEA 2.5 g, 0.0216 mol | T9 1.25 g, 0.0086 mol | 3.25 g, 0.021 mol | 0.025 g, |
| 8[2] | EtFOSEMA 7.5 g, 0.0120 mol | 350A 11.8 g, 0.0146 mol | HOEA 2.5 g, 0.0216 mol | 0.50 g, 0.0034 mol | 3.25 g, 0.021 mol | T9 0.025 |
| 9[5] | EtFOSEMA 6.0 g, 0.0096 mol | 750A 9.3 g, 0.0116 mol | HOEA 2.0 g, 0.0172 mol | 0.30 g, 0.0021 mol | 2.6 g, 0.0167 mol | T12 0.025 g, |
| 10[6] | EtFOSEMA 30 g, 0.0480 mol | 750A 47 g, 0.0584 mol | HOEA 10 g, 0.0862 mol | 1.5 g, 0.0103 mol | 13.1 g, 0.084 | T12 0.125 g, |
| 11[3] | EtFOSEMA 6.0 g, 0.0096 mol | 750A 9.3 g, 0.0116 mol | HOEA 2.0 g, 0.0172 mol | 0.30 g, 0.0021 mol | 2.6 g, 0.0167 mol | T12 0.025 g, |
| 12[2] | EtFOSEMA 3.7 g, 0.0059 mol | 750A 15.6 g, 0.0194 mol | HOEA 2.5 g, 0.0216 mol | 0.50 g, 0.0034 mol | 3.25 g, 0.0210 mol | T9 0.025 g, |
| 13[2] | EtFOSEMA 5.6 g, 0.0090 mol | 750A 13.7 g, 0.0170 mol | HOEA 2.5 g, 0.0216 mol | 0.50 g, 0.0034 mol | 3.25 g, 0.0210 mol | T9 0.025 g, |
| 14[2] | EtFOSEMA 8.7 g, 0.0139 mol | 750A 10.6 g, 0.0132 mol | HOEA 2.5 g, 0.0216 mol | 0.50 g, 0.0034 mol | 3.25 g, 0.0210 mol | T9 0.025 g, |
| 15[2] | EtFOSEMA 10.6 g, 0.0170 mol | 750A 8.7 g, 0.0108 mol | HOEA 2.5 g, 0.0216 mol | 0.50 g, 0.0034 mol | 3.25 g, 0.0210 mol | T9 0.025 g, |
| 16[2] | EtFOSEMA 3.8 g, 0.0061 mol MeFOSEA 3.8 g, 0.0064 mol | 750A 11.8 g, 0.0147 mol | HOEA 2.5 g, 0.0216 mol | 0.50 g, 0.0034 mol | 3.25 g, 0.0210 mol | T9 0.025 g, |
| 17[2] | EtFOSEMA 7.5 g, 0.0120 mol | 750A 11.8 g, 0.0147 mol | TBAEMA 2.5 g, 0.0135 mol | 0.50 g, 0.0034 mol | 2.04 g, 0.0132 mol | T12 0.025 |

*Solvent was Solvent 150, a $C_8$–$C_{11}$ aromatic naphtha (Central Solvent and Chemicals)
[1]Initiator amount: 0.625 g,
[2]Initiator amount: 0.06 g,
[3]Initiator amount: 0.05 g,
[4]Initiator amount: 0.20 g,
[5]Initiator amount: 0.10 g,
[6]Initiator amount: 0.25 g, Molecular weight data were obtained on three compositions of the invention. The only significant variable in the preparation of these compositions was in the amount of chain transfer agent used. The data are set forth in Table 2.

TABLE 2

| | Molecular Weight and Dispersity | | |
|---|---|---|---|
| Example | Chain transfer agent (g) | Molecular Weight (wt. ave.) | Dispersity |
| 6 | 0.0625 | 20,012 | 4.49 |
| 7 | 1.25 | 12,313 | 1.75 |
| 8 | 0.5 | 16,974 | 2.38 |

The data in Table 2 show that the amount of chain transfer agent affects the length of the oligomeric chain of the fluorinated compounds.

Example 18

Part A

In an approximately 110 mL bottle was placed 7.0 g (0.011 mole) of N-ethyl perfluoro(octane)sulfonamidoethyl methacrylate, 12.0 g (0.015 mole) of CARBOWAX 750 acrylate (750A), 1.0 g (0.007 mole) of 2-vinyl-4,4-dimethyl-2-oxazoline-5-one (VDM), 32.6 g ethyl acetate, 0.30 g of n-octyl thiol, and 0.20 g azobisisobutyronitrile. The bottle was deaerated under reduced pressure, purged with nitrogen, capped tightly and heated and agitated in a Launder-O-Meter at 75° C. for 16 hours to afford an azlactone-functional intermediate of Formula II. The bottle was removed and allowed to cool to room temperature.

Part B

To the solution from Part A was added 0.66 g (0.006 mole) of 2-hydroxyethyl acrylate and 0.04 g (2 drops) of methane sulfonic acid catalyst. The bottle was then tightly capped and shaken at room temperature (about 22° C.) for 8 hours. IR and NMR analysis of a sample of the resulting amber solution showed no unreacted azlactone groups and indicated the presence of acrylate, fluoroaliphatic, and polyoxyethylene groups.

Examples 19–22

Following the general procedure of Example 18 except that in Example 22, Part B, reaction temperature was 70° C. and reaction time was 40 hours. Compositions were prepared as indicated in Table 3 below, wherein EtFOSEMA represents  $C_8F_{17}SO_2N(C_2H_4OC(O)C(CH_3)=CH_2$;

DMVA represents 2-vinyl-4,4-dimethyl-2-oxazoline-5-one;

GMA represents

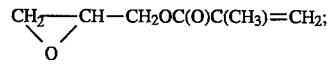

HOEA represents $HOC_2H_4OC(O)CH=CH_2$;

AMC-2 represents chromium octoate in mineral spirits available from Aerojet Strategic Propulsion Co.; and 4-DMAP represents 4-(dimethylamino)pyridine.

TABLE 3

| | Part A | | | | Part B | |
|---|---|---|---|---|---|---|
| | | | | | Olefinic | |
| Example | Fluorinated Monomer (g, mol) | Solubilizing Monomer (g, mol) | Bifunctional Monomer (g, mol) | n-octylthiol (g, mol) | Reagent (g, mol) | Catalyst (g) |
| 18[1] | EtFOSEMA 7.0 g, 0.0112 mol | 750A 12 g, 0.0149 mol | DMVA 1.0 g, 0.0072 mol | 0.3 g, 0.0021 mol | HOEA 0.66 g, 0.0057 mol | $CH_3SO_3H$ 0.04 g, |
| 19[1] | EtFOSEMA 6.0 g, 0.0096 mol | 750A 10.7 g, 0.0133 mol | DMVA 2.0 g, 0.0144 mol | 0.3 g, 0.0021 mol | HOEA 1.33 g, 0.0115 mol | $CH_3SO_3H$ 0.62 g, |
| 20[1] | EtFOSEMA 6.0 g, 0.0096 mol | 750A 7.3 g, 0.0091 mol | DMVA 4.0 g, 0.0288 mol | 0.3 g, 0.0021 mol | HOEA 2.60 g, 0.0224 mol | $CH_3SO_3H$ 0.62 g, |
| 21*[1] | EtFOSEMA 10 g, 0.0160 mol | ODMA 6.7 g, 0.0198 mol | DMVA 2.0 g, 0.0144 mol | 0.15 g, 0.0010 mol | HOEA 1.33 g, 0.0115 mol | $CH_3SO_3H$ 0.02 g, |
| 22[2] | EtFOSEMA 7.5 g, 0.010 mol | 750A 11.8 g, 0.0147 mol | GMA 2.5 g, 0.0176 mol | 0.5 g, 0.0034 mol | Acrylic Acid 1.12 g, 0.0155 mol | AMC-2 0.16 g, 4-DMAP 0.16 g, |

*Solvent was Solvent 150, a $C_8$–$C_{11}$ aromatic naphtha (Central Solvent and Chemicals)
[1]Initiator amount: 0.20 g
[2]Initiator amount: 0.06 g Surface tension depression properties at four concentrations were obtained for the compositions of Examples 1–22 in acrylate monomers and mixtures thereof as indicated in Table 4, wherein IOA represents isooctylacrylate (surface tension=27.5 dynes/cm); and IOA/AA represents isooctylacrylate/acrylic acid in a 90/10 weight/weight ratio (surface tension=27.8 dynes/cm). A lack of an entry indicates that the value was not measured.

TABLE 4

| | SURFACE TENSION (dynes/cm) AND CONCENTRATION | | | | | | | |
|---|---|---|---|---|---|---|---|---|
| | Wt. % | 0.01 wt. % | 0.10 wt. % | | 0.50 wt. % | | 1.0 wt. % | |
| Composition | fluorine | IOA | IOA | IOA/AA | IOA | IOA/AA | IOA | IOA/AA |
| Example 1 | 15.0 | 23.3 | 21.7 | — | 20.4 | — | 19.1 | — |
| Example 2 | 15.4 | 23.3 | 22.2 | — | 21.9 | — | 21.6 | — |
| Example 3 | 15.3 | 25.1 | 21.9 | — | 20.4 | — | 20.0 | — |

TABLE 4-continued

| | SURFACE TENSION (dynes/cm) AND CONCENTRATION | | | | | | | |
|---|---|---|---|---|---|---|---|---|
| | Wt. % | 0.01 wt. % | 0.10 wt. % | | 0.50 wt. % | | 1.0 wt. % | |
| Composition | fluorine | IOA | IOA | IOA/AA | IOA | IOA/AA | IOA | IOA/AA |
| Example 4 | 18.2 | 23.6 | 21.4 | — | 20.5 | — | 19.4 | — |
| Example 5 | 25.3 | 23.8 | 22.7 | — | 21.9 | — | 21.4 | — |
| Example 6 | 15.0 | 26.0 | 20.0 | — | 19.4 | — | 16.9 | — |
| Example 7 | 15.0 | 25.6 | 21.6 | — | 20.0 | — | 19.3 | — |
| Example 8 | 15.0 | 24.1 | 20.5 | — | 19.2 | — | 18.6 | — |
| Example 9 | 15.0 | — | — | 26.5 | — | 24.0 | — | 24.0 |
| Example 10 | 15.0 | 24.4 | 21.5 | — | 20.3 | — | 19.8 | — |
| Example 11 | 15.0 | 23.2 | 21.4 | 26.5 | 19.7 | 23.5 | 19.4 | 23.0 |
| Example 12 | 7.3 | 27.3 | 25.7 | — | 24.1 | — | 23.1 | — |
| Example 13 | 11.1 | 25.2 | 23.2 | — | 22.0 | — | 21.8 | — |
| Example 14 | 17.3 | 23.7 | 21.4 | — | 19.7 | — | 19.3 | — |
| Example 15 | 21.2 | 22.5 | 20.6 | — | 19.0 | — | 18.6 | — |
| Example 16 | 15.3 | 24.1 | 22.4 | — | 21.7 | — | 21.5 | — |
| Example 17 | 15.7 | 24.7 | 23.7 | — | 22.0 | — | 21.6 | — |
| Example 18 | 16.9 | 23.4 | 21.3 | 24.5 | 20.3 | 22.5 | 19.7 | 21.5 |
| Example 19 | 15.0 | 25.1 | 23.9 | 24.0 | 23.1 | 23.5 | 22.4 | 23.0 |
| Example 20 | 15.0 | 25.4 | 24.2 | 26.0 | 23.9 | 25.5 | 23.9 | 26.0 |
| Example 21 | 25.0 | 24.9 | 24.3 | 26.5 | 24.0 | 26.0 | 23.6 | 25.5 |
| Example 22 | 16.3 | 25.6 | 22.8 | — | 20.9 | — | 20.0 | — |
| A[1] | — | 24.0 | 21.9 | — | 21.0 | — | 20.7 | — |
| B[2] | — | 24.9 | 24.3 | 25.0 | 24.0 | 23.5 | 23.6 | 22.5 |

[1] An oligomeric fluorochemical acrylate copolymer surfactant free of polymerizable olefinic unsaturation, commercially available from 3M under the trade designation FLUORAD ™ FC-431 coating additive.
[2] An oligomeric fluorochemical acrylate copolymer surfactant free of polymerizable olefinic unsaturation, commercially available from 3M under the trade designation FLUORAD ™ FC-740 well stimulation additive.

The data in Table 4 indicate that a polymerizable surfactant of the invention lowers the surface energy of acrylate monomers and mixtures thereof to a generally greater extent than do the non-polymerizable fluorochemical surfactants.

Table 5 below sets forth adhesion data for a cured isooctyl acrylate/acrylic acid adhesive composition containing the indicated concentration of a polymerizable fluorochemical surfactant of the invention. Adhesion data are shown for stainless steel and acrylonitrile/butadiene/styrene copolymer (ABS) substrates. The data were obtained according to the test methods set forth above, and the compositions were prepared as follows:

A partially polymerized acrylate-containing mixture was prepared according to the general method set forth in Example 1 of U.S. Pat. No. 4,330,590 (Vesley), using a monomer mixture containing 90 parts by weight isooctyl acrylate, 10 parts by weight acrylic acid, and 0.04 parts by weight 2,2-dimethoxy-2-phenyl acetophenone. The resulting acrylate-containing mixture was partially polymerized by ultraviolet irradiation to a Brookfield viscosity of about 3300 cps. The material was then modified by adding 2,2-dimethoxy-2-phenyl acetophenone (0.15 parts by weight) and 4-(p-methoxyphenyl)-2,6-bistrichloromethyl-S-triazine (0.15 parts by weight).

The resulting partially polymerized acrylate-containing mixture was incorporated into a pressure-sensitive adhesive transfer tape as follows:

A surfactant is added to the partially polymerized acrylate-containing mixture in the desired amount. The composition is then coated at a thickness of 0.05 mm against a low-adhesion carrier using a knife coater. The coated carrier is then irradiated with about 125 mJ/cm$^2$ of ultraviolet radiation (as measured by a DYNACHEM™ Model 500 Radiometer) from a bank of lamps having 90 percent of their radiant energy in the range between 300 nm and 400 nm and having a maximum of 351 nm.

TABLE 5

| | | Adhesion (ounces per 0.5 inch) | | | | | |
|---|---|---|---|---|---|---|---|
| | | Stainless Steel | | | ABS | | |
| Composition | Conc. | 1N | 3RT | 3HA | 1N | 3RT | 3HA |
| Example 9 | 0.1 | 41 | 110 | 123 | 42 | 52 | 70 |
| Example 9 | 1.0 | 42 | 113 | 127 | 45 | 65 | 77 |
| Example 10 | 0.1 | 26 | 80 | 90 | 37 | 55 | 50 |
| Example 10 | 1.0 | 29 | 83 | 91 | 30 | 50 | 36 |
| Example 11 | 0.1 | 25 | 57 | 55 | 24 | 47 | 41 |
| Example 11 | 1.0 | 43 | 117 | 121 | 29 | 56 | 67 |
| Example 18 | 0.1 | 57 | 112 | 94 | 33 | 56 | 56 |
| Example 18 | 1.0 | 49 | 94 | 108 | 34 | 44 | 47 |
| Example 19 | 0.1 | 51 | 112 | 102 | 39 | 52 | 55 |
| Example 19 | 1.0 | 50 | 112 | 110 | 62 | 53 | 58 |
| Example 20 | 0.1 | 45 | 109 | 98 | 39 | 57 | 70 |
| Example 20 | 1.0 | 32 | 101 | 108 | 36 | 49 | 56 |
| Example 21 | 0.1 | 49 | 82 | 96 | 38 | 48 | 51 |
| Example 21 | 1.0 | 32 | 74 | 79 | 34 | 51 | 57 |
| A[1] | 0.1 | 37 | 77 | 76 | 34 | 59 | 30 |
| A[1] | 1.0 | 32 | 37 | 35 | 30 | 44 | 34 |

[1] An oligomeric fluorochemical acrylate copolymer surfactant free of polymerizable olefinic unsaturation commercially available from 3M under the trade designation FLUORAD ™ FC-431 coating additive.

The data in Table 5 show that these cured adhesive compositions comprising a polymerizable surfactant of the invention generally maintain good adhesion to the indicated substrates. On the other hand, the adhesive compositions comprising a non-polymerizable fluorinated surfactant generally have lesser adhesion to the indicated substrates, particularly after accelerated aging.

Various modifications and alterations of this invention will become apparent to those skilled in the art without departing from the scope and spirit of this invention, and it should be understood that this invention is not to be unduly limited to the embodiments set forth herein.

We claim:

1. A polymerizable, organic-soluble, oligomeric fluorochemical surfactant composition comprising one or more fluorinated oligomers, each comprising at least two pendent fluoroaliphatic groups containing from 6 to 12 carbon atoms, at least two organic-solubilizing groups, and at least one pendent free-radically polymerizable olefinic group selected from the group consisting of ethenyl acrylate groups, ethenyl vinyl ether groups, and 2-propenyl methacrylate groups.

2. A polymerizable fluorochemical surfactant composition according to claim 1, wherein the fluorinated oligomers comprise an aliphatic backbone having bonded thereto:

(i) at least two fluoroaliphatic groups, each having a fully fluorinated terminal group;

(ii) at least one organic-solubilizing group, each comprising a plurality of carbon atoms and may contain one or more catenary oxygen atoms; and (iii) at least one polymerizable olefinic group, each fluoroaliphatic group, organic-solubilizing group, and polymerizable olefinic group being independently bonded to the aliphatic backbone through a covalent bond, a heteroatom, or an organic linking group.

3. A polymerizable fluorochemical surfactant composition according to claim 1, wherein the fluorinated oligomers comprise a portion represented by the formula

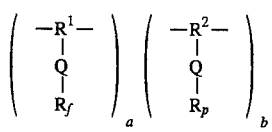

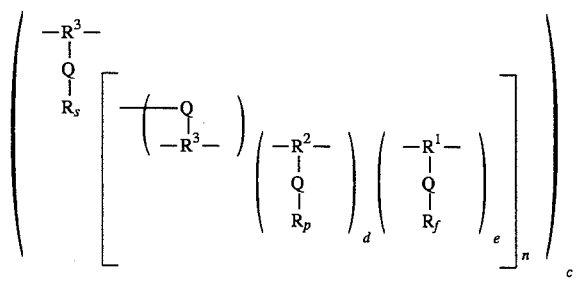

I wherein:

$R^1$, $R^2$, and $R^3$ independently represent polymerized units derived from polymerizable olefinic monomers and together form an aliphatic backbone;

each Q independently is a covalent bond, a heteroatom, or an organic linking group;

$R_f$ is a fluoroaliphatic group containing a fully fluorinated terminal group;

$R_s$ is an organic-solubilizing group comprising a plurality of carbon atoms and may contain one or more catenary oxygen atoms;

$R_p$ is a polymerizable olefinic group; and a, b, c, d, and e are whole numbers such that the compound is oligomeric, and each n is independently zero or one.

4. A composition according to claim 1, wherein the oligomers comprise from 2 to about 25 fluoroaliphatic groups.

5. A composition according to claim 1, wherein the oligomers comprise about 5 percent to about 30 percent fluorine by weight based on the total weight of the compound, the loci of the fluorine being essentially in the $R_f$ groups.

6. A composition according to claim 1, wherein the oligomers comprise a plurality of solubilizing groups.

7. A composition according to claim 1, wherein the oligomers comprise 4 to about 30 solubilizing groups.

8. A composition according to claim 1, wherein the solubilizing groups contain from about 8 to about 50 carbon atoms and are straight chain, branched chain, cyclic, or a combination thereof.

9. A composition according to claim 1, wherein the solubilizing groups are pendent to the fluorinated oligomer.

10. A polymerizable fluorochemical surfactant composition according to claim 3, wherein each n is zero.

11. A composition according to claim 1, wherein solubilizing groups are catenary.

12. A polymerizable fluorochemical surfactant composition according to claim 3, wherein each n is one.

13. A composition according to claim 1, having a mixture of pendent and catenary solubilizing groups.

14. A polymerizable fluorochemical surfactant composition according to claim 3, wherein at least one n is zero and at least one n is one.

15. A composition according to claim 1, wherein the solubilizing groups are polyoxyalkylenyl, straight chain, branched chain, or cyclic alkyl or alkylene, or a combination thereof.

16. A composition according to claim 1, comprising a plurality of polymerizable olefinic groups.

17. A composition according to claim 1, comprising one polymerizable olefinic group.

18. A composition according to claim 2, wherein the backbone comprises about 5 to about 100 polymerized units.

19. A composition according to claim 3, wherein the sum of a and all occurrences of e is about 2 to about 25.

20. A composition according to claim 3, wherein c is about 2 to about 60.

21. A composition according to claim 3, wherein the sum of b and all occurrences of d is 1 to about 60.

22. A composition according to claim 3, wherein for linking $R_f$, Q is alkylene, sulfonamido, or sulfonamidoalkylene; for linking $R_s$, Q is carbonyloxy; and for linking $R_p$, Q is —C(O)O(CH$_2$)$_2$OC(O)NH(CH$_2$)$_2$OC(O)—.

* * * * *

UNITED STATES PATENT AND TRADEMARK OFFICE
CERTIFICATE OF CORRECTION

PATENT NO. : 5,468,812
DATED : November 21, 1995
INVENTOR(S) : Imelda A. Muggli and Roger R. Alm It is certified that error appears in the above-indentified patent and that said Letters Patent is hereby corrected as shown below:

Column 5, line 44, delete "-$(CH_2)_kC(O)O$-" and insert ---$(CH_2)_kO(CH_2)_kO(O)C$---.

Column 5, line 49, before "-$(CH_2)_kSO_2$-" insert ---$(CH_2)_kSO_2NR(CH_2)_kO(O)C$---.

Columns 11 and 12:

Table 1, Example 7[2], delete "T9" from n-octylthiol (g, mol) column and insert in Catalyst (g) column.

Table 1, Example 8[2], delete "350A" and replace with --750A--.

Table 1, Example 10[6], delete "0.084" from IEM (g, mol) column and replace with --0.0845 mol--.

Column 14, line 9, delete "$C_8F_{17}SO_2N(C_2H_4OC(O)C(CH_3)=CH_2$" and replace with --$C_8F_{17}SO_2N(C_2H_5)C_2H_4OC(O)C(CH_3)=CH_2$--.

Columns 13 and 14:

Table 3, Example 19[1], delete "0.62 g" and replace with --0.02 g--.

Table 3, Example 20[1], delete "0.62 g and replace with --0.02 g--.

Table 3, Example 22[2], delete "0.010 mol" and replace with --0.0120 mol--.

Signed and Sealed this

Fourteenth Day of May, 1996

Attest:

BRUCE LEHMAN

*Attesting Officer*  *Commissioner of Patents and Trademarks*